March 26, 1963     H. C. TRUEBLOOD     3,083,333
HALF-CYCLE RESET MAGNETIC AMPLIFIERS
Filed Oct. 1, 1958     4 Sheets-Sheet 1

$E \sin \omega t$ (a)

(b)

HAROLD C. TRUEBLOOD
INVENTOR.

BY

ATTORNEY

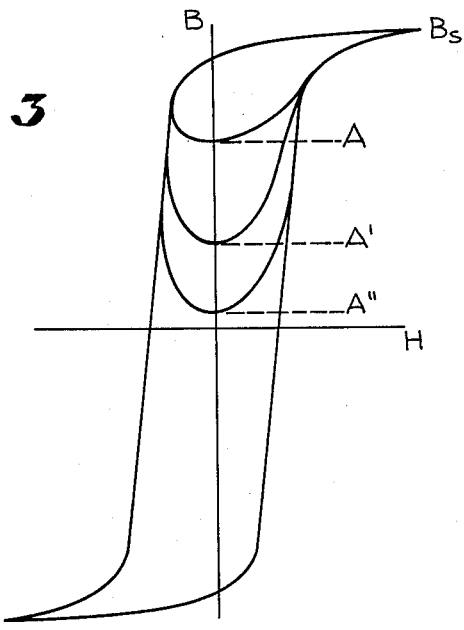
Fig. 3
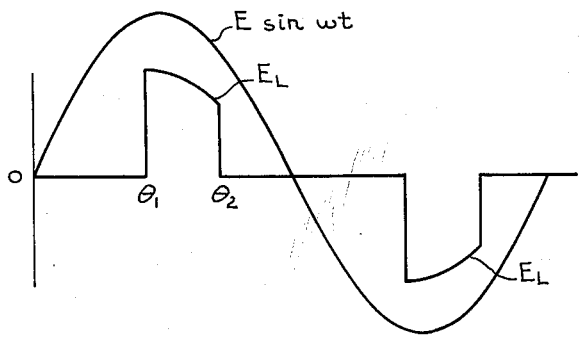
Fig. 5 (a)
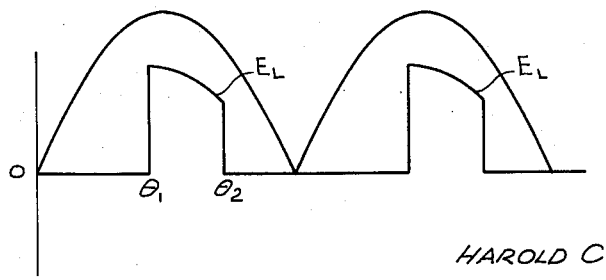
(b)

March 26, 1963  H. C. TRUEBLOOD  3,083,333
HALF-CYCLE RESET MAGNETIC AMPLIFIERS
Filed Oct. 1, 1958  4 Sheets-Sheet 3

HAROLD C. TRUEBLOOD
INVENTOR.

BY Robert H. Fraser
ATTORNEY

March 26, 1963 H. C. TRUEBLOOD 3,083,333
HALF-CYCLE RESET MAGNETIC AMPLIFIERS
Filed Oct. 1, 1958 4 Sheets-Sheet 4

HAROLD C. TRUEBLOOD
INVENTOR.

BY
ATTORNEY

United States Patent Office 3,083,333
Patented Mar. 26, 1963

3,083,333
HALF-CYCLE RESET MAGNETIC AMPLIFIERS
Harold C. Trueblood, Hawthorne, Calif., assignor, by mesne assignments, to Thompson Ramo Wooldridge Inc., Cleveland, Ohio, a corporation of Ohio
Filed Oct. 1, 1958, Ser. No. 764,543
22 Claims. (Cl. 323—89)

This invention relates to magnetic amplifiers and more particularly to a full wave reversible phase magnetic amplifier utilizing saturable reactors which are periodically reset to a level of magnetization in response to a control signal.

A particular type of half-cycle reset magnetic amplifier utilizing a single saturable reactor may be found described in an article entitled "On the Mechanics of Magnetic Amplifier Operation" by R. A. Ramey, Transactions of the American Institute of Electrical Engineers, vol. 70, Part II (1951) pp. 1214–1223. In the Ramey amplifier an alternating current passes to a load circuit via a saturable reactor which conducts current on alternate half-cycles of an applied alternating current wave. The level of magnetization within the saturable reactor is reset on each intervening half-cycle so that an applied alternating current gating voltage raises the level of magnetization above saturation with the result that the impedance of the saturable reactor drops to a low value permitting current to pass to the load for a period depending upon the level of magnetization to which the saturable reactor is reset.

While the Ramey amplifier is a useful device for providing a half-wave output voltage in response to a direct current control signal of one given polarity, many applications require the amplification of alternating currents of reversible phase and direct currents of reversible polarity with a full wave output signal appearing across a load circuit. For example, a need for a full wave reversible phase amplifier arises in many servo systems in which a two-phase alternating current motor receives a fixed phase alternating current wave on one winding and a wave of reversible phase and variable amplitude on another winding which causes the motor to turn in a direction and to an extent which rebalances the servo system.

A directional control can be obtained by using additional saturable reactors. In the simplest case, two half-wave amplifiers may be connected back to back. One such arrangement is shown and described in an article entitled "A Fast Response Magnetic Servo Amplifier" by J. W. Kallander, Communications and Electronics, No. 17 (March 1955) pp. 49–54. Even though a simple two-core amplifier is adequate for some applications, where more power and shorter time constants are required, there has been no known prior arrangement for utilizing half-cycle reset magnetic amplifiers in a full wave reversible phase system.

Accordingly, it is a principal object of the present invention to provide a new and improved magnetic amplifier for providing a full wave reversible output signal.

It is an additional object of the present invention to provide a new and improved magnetic amplifier utilizing four saturable reactors which are interconnected to provide a full wave output signal which is reversible in phase or polarity.

It is yet another object of the present invention to provide a new and improved magnetic amplifier having a rapid response to fluctuations in the value of an input signal.

It is still another object of the present invention to provide a new and improved magnetic amplifier for use in driving a two-phase motor in a servo system.

Briefly, in accordance with the invention, an alternating current wave is passed to a load circuit via selected ones of four circuit paths in each of which is connected a saturable reactor. By means of control windings associated with each of the saturable reactors, the condition of magnetization of the core of each of the reactors may be established at a level at which alternating currents are passed via selected ones of the saturable reactors to a load circuit for periods dependent upon the value of an input signal. Each of the control windings is adapted to receive an alternating current wave which resets each of the saturable reactors to an appropriate magnetization level during one-half cycle of each full cycle of the alternating current wave.

In one particular arrangement of the invention an alternating current input signal controls the condition of conductivity of a pair of transistors connected serially with the control windings so that an amount of current flows from an alternating current source through the control windings to reset the saturable reactors to a level dependent upon the phase and amplitude of the control signal to produce an alternating current output signal in a load circuit.

In other arrangements of the invention, a D.-C. output signal may be produced in a load circuit in response to an A.-C. input signal, a D.-C. output signal may be produced in response to a D.-C. input signal, and an A.-C. output signal may be produced in response to a D.-C. input signal.

One particular feature of the invention includes biasing means for establishing circulating currents which pass through the saturable reactors to improve the frequency response and gain of the amplifier.

A better understanding of the invention may be had from a reading of the following detailed description and an inspection of the drawings, in which:

FIG. 3 is a graphical illustration of the magnetization characteristic of the core of a saturable reactor;

FIG. 5 is a graphical illustration of the relationship between gating voltages and output voltages in a magnetic amplifier of the invention.

Figure 1:
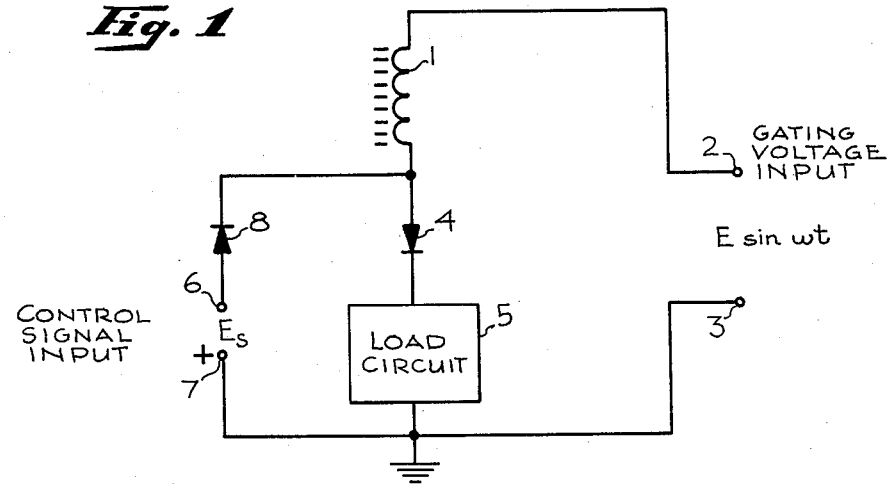
FIG. 1 is a combined block and schematic circuit diagram of a known type of single core magnetic amplifier included here for purposes of explanation.
Figure 1:
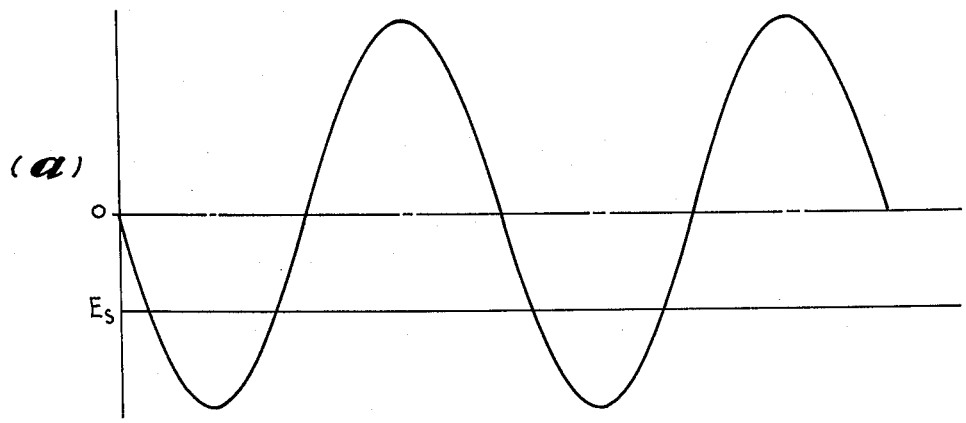
Figure 1:
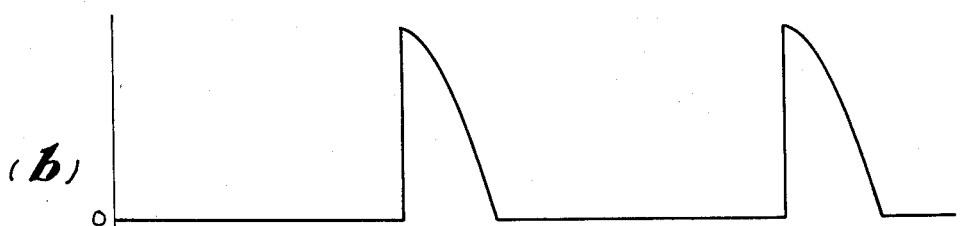

The circuit of FIG. 1 illustrates a simple form of a single core magnetic amplifier with D.-C. control and a half-wave output. The circuit of FIG. 1 is known as a Ramey single core magnetic amplifier and may be found described in detail in the article "On the Mechanics of Magnetic Amplifier Operation," supra. The amplifier circuit of FIG. 1 includes a saturable reactor 1 having a magnetically saturable core which presents a high impedance to the passage of current so long as the core does not reach a level of magnetic saturation. Where the time-integrated value of voltage across the winding is sufficient to saturate the core, the impedance of the saturable reactor drops to a low value permitting current to pass substantially unimpeded. Preferably, the core should be constructed of a magnetizable material having a substantially rectangular hysteresis loop.

In FIG. 1 an alternating current gating voltage applied to the terminals 2 and 3 appears across a series circuit comprising the saturable reactor 1, a unidirectional conduction device such as a diode 4, and a load circuit 5. So long as the core of the saturable reactor 1 does not reach a magnetically saturated level, the saturable reactor 1 presents a high impedance to the flow of current so that substantially no current flow passes to the load circuit 5 via the diode 4.

The flow of current through the saturable reactor 1 is dependent upon the value of a control signal applied to the terminals 6 and 7 which determines the current flow through the saturable reactor 1 on each negative half-cycle of the wave applied to the terminals 2 and 3 so as to reset the level of magnetization of the core of the saturable reactor 1 in accordance with the value of the control signal. For example, assuming that the input signal terminals 6 and 7 are shorted (corresponding to a control signal equal to zero), the alternating current gating voltage $E \sin \omega t$ switches the magnetization of the saturable reactor 1 between negative saturation ($-B_s$) and positive saturation ($+B_s$), with the core of the saturable reactor 1 reaching a level of saturation only when the alternating current gating voltage passes through zero. Therefore, the relatively high impedance of the saturable reactor 1 prevents any substantial amount of current flow to the load circuit 5. However, where the control signal applied to the terminals 6 and 7 has a finite value, current flow on the negative half-cycle of the alternating current gating voltage resets the core of the saturable reactor 1 to a magnetization level which is dependent upon the value of the control signal. On a subsequent positive half-cycle, the level of magnetization of the magnetically saturable core is raised to saturation so that the impedance of the saturable reactor 1 drops to a low value at which a substantial amount of current flows to a load circuit via the diode 4. The result is that a portion of each positive half-cycle of the gating voltage is passed to the load circuit 5 for a period dependent upon the value of the control signal applied to the terminals 6 and 7.

Figure 2:
FIG. 2 is a set of graphical illustrations of various voltages and current waveforms appearing in the magnetic amplifier of FIG. 1.

The operation of the circuit of FIG. 1 is illustrated in FIGS. 2 and 3 in which FIG. 2(a) represents the alternating gating voltage and a negative D.-C. control signal ($E_s$), and FIG. 2(b) illustrates the current flow through the load circuit 5 of FIG. 1. FIG. 3 represents the magnetization characteristic followed by the core of the saturable reactor 1 of FIG. 1 for various values of control signals. Where the control signal ($E_s$) possesses a finite value as illustrated in FIG. 2(a), the magnetization of the core of the saturable reactor 1 follows a minor hysteresis loop characteristic along which the magnetization of the core is established at a level corresponding to the value of the control signal. Where the control signal is equal to zero, the magnetization of the core is switched by the gating voltage between a positive saturation level ($B_s$) and a negative saturation level ($-B_s$). However, for finite values of a control signal applied to the terminals 6 and 7, the material follows a minor hysteresis loop so that the material is reset on each negative half-cycle of the gating voltage to a level such as, for example, one of the levels A, A' or A''.

Upon each positive half-cycle of the gating voltage where the material reaches a level of saturation, the impedance of the saturable reactor 1 is reduced to a low value at which current flows in the load circuit 5 as illustrated in FIG. 2(b). For varying values of control signals applied to the terminals 6 and 7, the portion of the positive half-cycle occurring after saturation is reached may be increased or decreased due to the resetting of the core of the saturable reactor 1 at various magnetization levels.

When a reactor is saturated and its impedance drops to a low value, the reactance is said to "fire." The firing angle is defined as that angle through which the gating voltage vector must turn before saturation is reached. Accordingly, in the amplifier of FIG. 1, the firing angle depends upon the value of the control signal applied to the terminals 6 and 7.

Figure 4:
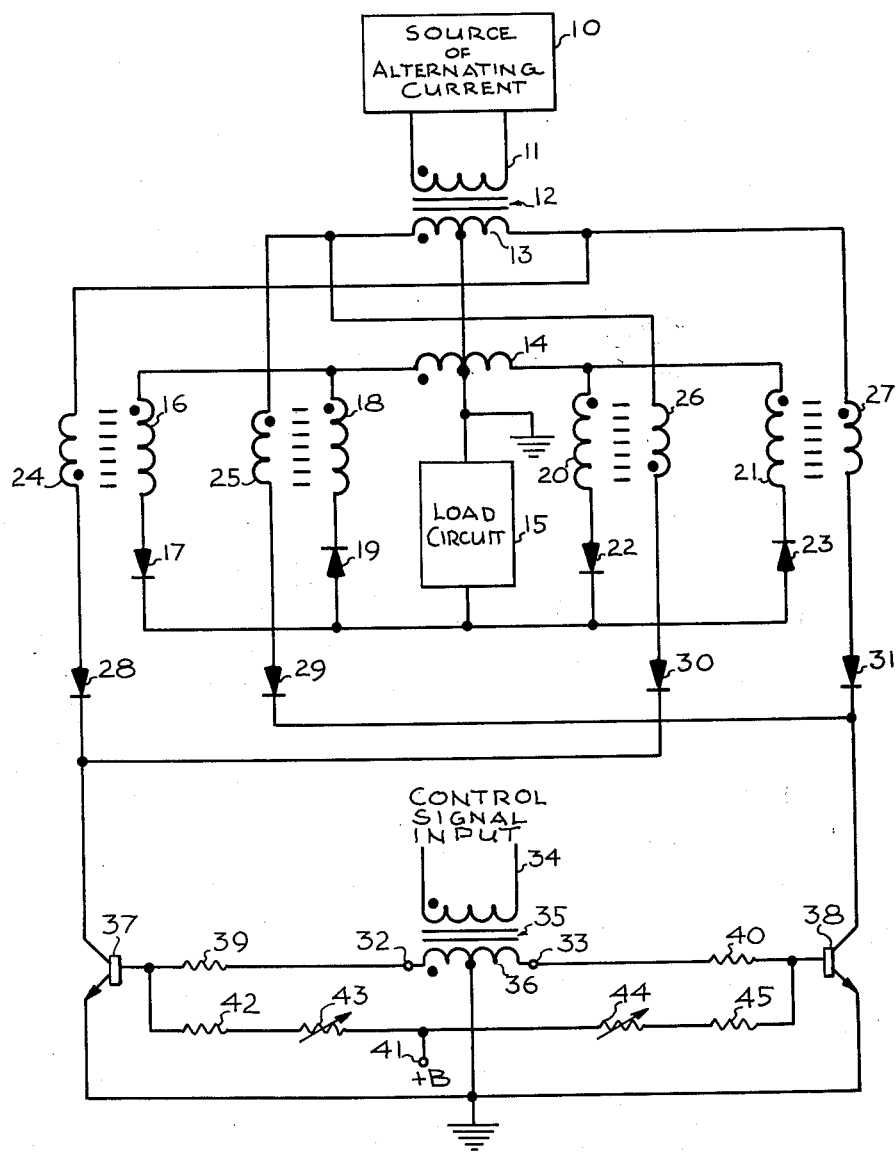
FIG. 4 is a combined block and schematic circuit diagram of a four-core full wave reversible phase magnetic amplifier in accordance with the invention.

FIG. 4 illustrates a four-core full wave reversible phase magnetic amplifier in accordance with the invention in which four saturable reactors functioning in a manner somewhat similar to that described above in connection with FIG. 1 are periodically reset to a magnetization level dependent upon the value and polarity of a control signal so as to control the flow of an alternating current wave to a load circuit.

In FIG. 4 an alternating current wave from a source of alternating current 10 is applied to the primary winding 11 of a transformer 12, having a pair of secondary windings 13 and 14. The alternating current waves appearing across each of the secondary windings 13 and 14 are balanced with respect to ground, i.e. push-pull, by virtue of the fact that the center taps of the secondary windings are returned to ground reference potential. Between the left-hand end of the secondary winding 14 and the load circuit 15 a saturable reactor load winding 16 and a diode 17 form one circuit path for the passage of positive half-cycles of the alternating current wave and a saturable reactor load winding 18 and a diode 19 form another circuit path for the passage of negative half-cycles of the alternating current wave. By virtue of the diodes 17 and 19 being connected in opposite directions of conductivity, the circuit paths of the saturable reactor load windings 16 and 18 are capable of passing alternate half-cycles of an alternating current wave to the load circuit 15.

In a similar fashion, two separate circuit paths are connected between the right-hand end of the secondary winding 14 and the load circuit including the saturable reactor load windings 20 and 21 and the diodes 22 and 23 for passing positive and negative half-cycles of alternating current, respectively.

By means of the control windings 24, 25, 26 and 27 associated with each of the saturable reactors, the level of magnetization within the core of each of the saturable reactors may be established at a desired level to control the flow of current from the secondary winding 14 to the load circuit 15. The setting of the magnetization level of the core of each of the saturable reactors to the desired level is accomplished by current flow through the control windings 24–27 from the upper secondary winding 13. Each of the control windings 24–27 is connected serially with a unidirectional conduction device such as the diodes 28, 29, 30 and 31 which are connected to pass positive half-cycles of an alternating current wave only. Thus, when the left-hand end of the secondary winding 13 provides a positive half-cycle, the control windings 25 and 26 receive currents while the control windings 24 and 27 receive control currents only when a positive half-cycle appears at the right-hand end of the secondary winding 13.

The amount of current flowing through the control windings 24–27 is determined by a control signal applied to the terminals 32 and 33 which may be, for example, an alternating current signal applied to the primary winding 34 of a transformer 35 having a secondary winding 36 connected between the terminals 32 and 33. The wave appearing between the terminals 32 and 33 is applied to two transistors 37 and 38 via the current limiting resistors 39 and 40 so that in the case of an alternating current wave, the transistors 37 and 38 are alternately biased in a forward direction with the result that on each half-cycle of the control voltage one of the transistors 37 and 38 presents a low impedance path to ground for currents passing through the control windings 24–27.

Since the diodes 17, 19, 22 and 23 restrict the current flow through each of the saturable reactor load windings 16, 18, 20 and 21 to one direction only, in the absence of a control signal applied to the terminals 32 and 33 the saturable reactors remain at a level of saturation so that current passes through the saturable reactor load windings 16 and 21 on one half-cycle and through the saturable reactor load windings 20 and 18 on the other half-cycle. Thus, in the absence of a control signal, all of the current from the secondary winding 14 passes through the saturable reactor load windings 16, 18, 20 and 21 and bypasses the load circuit 15.

Where an alternating current control signal is applied to the terminals 32 and 33 which is in phase with the wave appearing across the secondary winding 13, control current passes through the control winding 26 on one half-cycle and through the control winding 27 on the other half-cycle so that the saturable reactors associated with the control windings 26 and 27 are reset to a level of magnetization substantially below the saturation level. The result is that the alternating current wave from the secondary winding 14 passes through the load windings 16 and 18 of the non-reset saturable reactors to the load circuit 15 for a portion of each half-cycle until the saturable reactors associated with the load windings 20 and 21 are raised to a saturation level, at which time the current bypasses the load circuit 15 and passes through the saturable reactor load windings 16, 18, 20 and 21 only. Accordingly, depending upon the magnitude of the control signal applied to the terminals 32 and 33, a selected two of the saturable reactors of the amplifier of FIG. 4 are reset to a level which determines the period that current flows through the load circuit 15 on each half-cycle of the alternating current wave from the source of alternating current 10.

In contrast, where an alternating current signal is applied to the terminals 32 and 33 which is out-of-phase with the wave appearing across the secondary winding 14, control current passes through the control windings 24 and 25 to reset the saturable reactors with which the load windings 16 and 18 are associated. The result is that current flows through the load windings 20 and 21 of the non-reset saturable reactors to the load circuit 15 for a portion of each half-cycle corresponding to the value of the control signal.

Since a portion of each half-cycle of the wave appearing across the secondary winding 14 is passed to the load circuit 15, the amplifier of FIG. 4 provides a full wave output signal. In addition, since the phase of the currents flowing through the load circuit 15 corresponds to the phase of the control signal applied to the terminals 32 and 33, the amplifier is capable of producing a full wave output signal of reversible phase corresponding to the amplitude and phase of the control signal.

Where the amplifier of FIG. 4 is employed to drive a two-phase reversible motor, one winding of the motor may be connected to the source of alternating current 10 via a 90° phase shifter (not shown) while the other winding may be connected to the load circuit 15 to receive a reversible phase full wave output signal which drives the motor in a direction and to an extent determined by the control signal applied to the terminals 32 and 33.

A particular feature of the arrangement of FIG. 4 is the inclusion of biasing means for establishing circulating currents through the saturable reactor load windings 16, 18, 20 and 21 which increase the rate of response of the circuit to fluctuations in the control signal. In FIG. 4, a positive potential applied to a terminal 41 is passed to the base of the transistors 37 and 38 via the resistors 42, 43, 44 and 45. By adjustment of the variable resistors 43 and 44, the transistors 37 and 38 may be biased in a forward direction so that the magnetization level at which the saturable reactors are set is dependent upon the combined effect of the value of the control signal applied to the primary winding 34 and the value of the bias. The result is that the saturable reactors may be arranged to fire in such a way that circulating currents are produced through the secondary winding 14 and the saturable reactor load windings 16, 18, 20 and 21 which do not pass through the load circuit 15. An example of this operation is illustrated in FIG. 5 in which $\theta_1$ represents the firing angle of a first saturable reactor functioning on each half-cycle and $\theta_2$ represents the firing angle of another saturable reactor functioning on the same half-cycle. In operation, the alternating current wave passing through the saturable reactor load windings 16, 18, 20 and 21 first raises one of the saturable reactors to a firing level and subsequently raises another saturable reactor to a firing level to bypass the load circuit 15 so that for the remainder of the half-cycle, current flows through the saturable reactor load windings rather than through the load circuit 15. The application of bias to the transistors 37 and 38 establishes reset levels in the saturable reactors which alter the firing angles in such a way as to speed up the response time of the circuit to fluctuations in the alternating current control signal and to increase the overall gain so that a larger output signal appears in the load circuit 15.

The magnetic amplifier of FIG. 4 may be utilized to amplify direct current input signals with a pulsating direct current output signal passing through the load circuit 15 by applying a direct current input signal to the terminals 32 and 33. For one polarity of input signal in which the transistor 37 is biased in a forward direction, the saturable reactors associated with the load windings 16 and 20 are reset so that a portion of each negative cycle of alternating current appearing at the ends of the winding 14 is passed to the load circuit 15 via the load windings 18 and 21 of the saturable reactors not reset. In contrast, when the polarity of the direct current input signal biases the transistor 38 in a forward direction, the saturable reactor load windings 18 and 21 are reset and a portion of each positive half-cycle appearing at the ends of the winding 14 is passed to the load circuit 15 via the load windings 16 and 20 of the saturable reactors not reset. Where the variable resistors 43 and 44 are set to establish a bias on the transistors 37 and 38, which produces circulating currents through the saturable reactors 16, 18, 20 and 21 as described above, the current flow through the load circuit 15 corresponds to FIG. 5(b), but with a polarity determined by the polarity of the control signal applied to the terminals 32 and 33.

Figure 6:
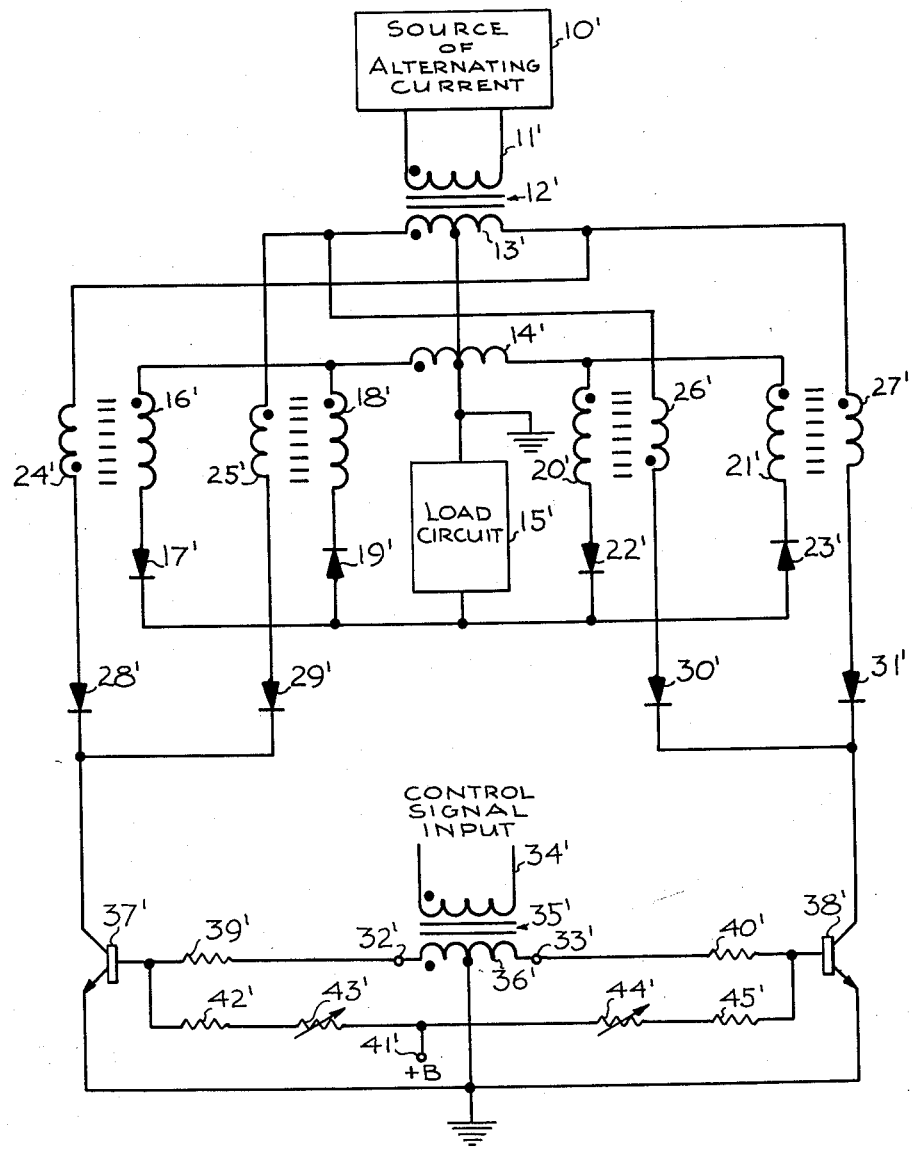
FIG. 6 is a combined block and schematic circuit diagram of an alternative arrangement of a four-core magnetic amplifier in accordance with the invention.

FIG. 6 illustrates an alternate arrangement of a magnetic amplifier in accordance with the invention which is capable of producing a pulsating direct current output signal in response to an alternating current control signal, or an alternating current output signal in response to a direct current control signal. The circuit of FIG. 6 is similar in its construction and operation to the circuit of FIG. 4 described above, except for a modification of the connections to the control windings. In FIG. 6 the same reference characters have been used as in FIG. 4 with the addition of a prime mark (′) to distinguish the elements of FIG. 6 from those of FIG. 4.

Where an alternating current control signal is applied to the terminals 32′ and 33′ of the magnetic amplifier of FIG. 6 and the control signal is in phase with the wave from the source of alternating current 10′, the saturable reactors associated with the load windings 18′ and 21′ are reset and current passes to the load circuit 15′ via the load windings 16′ and 20′ on each positive half-cycle of the wave appearing at the ends of the winding 14′ so that a pulsating direct current of positive polarity appears in the load circuit 15′. In contrast, where the alternating current control signal applied to the terminals 32′ and 33′ is out-of-phase with respect to the alternating current wave from the source of alternating current 10′, the saturable reactors associated with the load windings 16′ and 20′ are reset and a negative pulsating direct current is passed to the load circuit 15′ via the load windings 18′ and 21′. Where the variable resistors 43′ and 44′ are set to establish circulating currents through the saturable reactors, the waveform of the current through the load circuit 15′ corresponds to FIG. 5(b) for positive output signals and a similar waveform of opposite polarity for negative output signals.

The magnetic amplifier of FIG. 6 may also be employed to produce an alternating current output signal where a direct current control signal is applied to the input terminals 32′ and 33′. Where the direct current control signal biases the transistor 37' in a forward direction, the saturable reactors associated with the load windings 16' and 18' are reset and portions of each alternate positive and negative half-cycle of current are passed to the load circuit 15' via the load windings 20' and 21' associated with the saturable reactors not reset. In contrast, where the polarity of the direct current control signal biases the transistor 38' in a forward direction, the saturable reactors associated with the load windings 20' and 21' are reset and current passes to the load circuit 15' via the load windings 16' and 18' associated with the saturable reactors not reset. As before, where the variable resistors 43' and 44' are set to establish circulating currents in the saturable reactors, the waveform of the load current in the load circuit 15' corresponds to FIG. 5(a) for one polarity of control signal and of opposite phase for the reverse polarity of control signal.

Through the use of magnetic amplifiers constructed in accordance with the invention as described above, there is provided a new and improved means for amplifying direct and alternating currents with either a direct or alternating current output signal being provided on a full wave reversible phase basis. Although the invention is particularly useful in an arrangement in which an alternating current control signal produces an alternating current output signal for use in driving a two-phase servo motor, the magnetic amplifier of the invention may be readily adapted for use wherever it is necessary to amplify electrical signals or to convert electrical signals from alternating current to direct current or vice versa.

The particular arrangements of the invention shown and described above are given by way of example only. Accordingly, any modifications, variations, or alternative structures falling within the annexed claims should be considered to be encompassed by the invention.

What is claimed is:

1. A full wave reversible phase magnetic amplifier including the combination of a source of alternating current waves arranged to provide oppositely phased waves of equal amplitude, a load circuit, a first pair of saturable reactors connected between the alternating current source and the load circuit for selectively passing alternate half-cycles of the alternating current wave to the load circuit, a second pair of saturable reactors connected between the alternating current wave source and the load circuit for selectively passing alternate half-cycles of an alternating current wave of opposite phase with respect to the alternating current wave passed by the first pair of saturable reactors, a plurality of control windings one of which is associated with each of the saturable reactors, means for passing control currents through the control windings in response to an input signal which establishes levels of magnetization within the saturable reactors corresponding to the input signal whereby current is passed to the load circuit for a period during each half-cycle of the alternating current wave via selected ones of the saturable reactors, and biasing means for adjusting the magnitude of the control currents passed through selected control windings so as to establish circulating currents through selected saturable reactors which bypass the load circuit during a portion of each half-cycle of the alternating current wave succeeding the period in which current is passed to the load circuit.

2. A full wave reversible phase magnetic amplifier including the combination of a source of alternating current waves arranged to provide oppositely phased waves of equal amplitude, a load circuit, a first pair of saturable reactors connected between the alternating current source and the load circuit for selectively passing alternate half-cycles of the alternating current wave to the load circuit, a second pair of saturable reactors connected between the alternating current wave source and the load circuit for selectively passing alternate half-cycles of an alternating current wave of opposite phase with respect to the alternating current wave passed by the first pair of saturable reactors, a plurality of control windings one of which is associated with each of the saturable reactors, and means for controlling the voltage across the control windings in response to an input signal so that the time-integrated value of the voltage establishes selected levels of magnetization within the saturable reactors sufficient to block the flow of current to the load circuit during an initial interval of each half-cycle and to provide a low impedance circuit for allowing circulating currents to bypass the load circuit after a predetermined interval of transfer of current thereto.

3. A full wave reversible phase magnetic amplifier including the combination of a source of alternating current waves having a push-pull output, a load circuit, four separate circuit paths connected between the alternating current source and the load circuit, each of said circuit paths including a saturable reactor and a unidirectional conduction device connected serially, each of said saturable reactors having only one separate control winding for establishing a selected level of magnetization within the saturable reactor in response to current flow therethrough, and means for passing control currents through the control windings in response to the polarity and magnitude of a direct current input signal whereby each half-cycle of an alternating current wave from the alternating current source is passed to the load circuit via selected ones of the circuit paths to produce an alternating current output signal in the load circuit having a phase and amplitude corresponding to the polarity and magnitude of the control signal.

4. A full wave reversible phase magnetic amplifier including the combination of a source of alternating current waves having a push-pull output, a load circuit, four separate circuit paths connected between the alternating current source and the load circuit, each of said circuit paths including a saturable reactor and a unidirectional conduction device connected serially, each of said saturable reactors having a separate control winding for establishing a selected level of magnetization within the saturable reactor in response to current flow therethrough, means for controlling the time-integrated value of the voltage across each control winding in response to the polarity and magnitude of an input signal to reset each saturable reactor to a desired level whereby a first portion of each half-cycle of the alternating current wave from the alternating current source is passed to the load circuit via a selected one of the circuit paths to produce an output signal in the load circuit having a phase and amplitude corresponding to the polarity and magnitude of the control signal, and variable biasing means connected to the controlling means for varying the levels of magnetization within the saturable reactors so that a second portion of each half-cycle of the alternating current wave from the alternating current source is passed by a circulating current path which bypasses the load circuit.

5. A full wave reversible phase magnetic amplifier including the combination of an alternating current wave source having an output circuit across which appears a pair of oppositely phased waves comprising alternate positive and negative going half-cycles, a pair of circuit paths for passing alternate positive and negative going half-cycles of one of the two oppositely phased waves, a second pair of circuit paths for passing alternate positive and negative going half-cycles of the other of the two oppositely phased waves, each of said circuit paths including a saturable reactor which is adapted to block the flow of current below a level at which the saturable reactor is in a saturated magnetic condition, each of said saturable reactors including a control winding for establishing a desired level of magnetization within the saturable reactor, and means for passing current through the control windings to establish levels of magnetization within the saturable reactors at which the alternating current waves successively raise the level of magnetization within at least two of the saturable reactors to a level at which current flows to the load through the saturable reactors and raise the level of magnetization within the remaining saturable reactors to a level at which current bypasses the load to flow through the circuit paths.

6. A full wave reversible phase magnetic amplifier including the combination of a push-pull alternating current wave source, a load circuit, four separate circuit paths connected between the alternating current wave source and the load circuit for selectively passing positive and negative flowing currents during each half-cycle of an alternating current wave from the alternating current wave source, each of said circuit paths including a single load winding associated with a saturable core, a single control winding associated wtih each saturable core for establishing desired levels of magnetization in the saturable core in response to current flow therethrough, a source of control currents, control signal responsive means for passing control currents through the control windings to establish levels of magnetization within the saturable cores whereby negative and positive flowing currents are passed by selected ones of the load windings to the load circuit in accordance with the control signal, and biasing means for selecting the magnitudes of control currents passing through individual ones of the control windings to establish different levels of magnetization within the saturable cores so that circulating currents are established through at least two of the saturable reactors bypassing the load circuit during at least a portion of each half-cycle of a wave derived from the alternating current wave source.

7. A full wave reversible phase magnetic amplifier including the combination of a source of balanced alternating current waves, a single-ended load circuit, a first pair of circuit paths connected between the alternating current source and the load circuit for individually passing alternate half-cycles of an alternating current wave from the alternating current wave source having a first given phase, a second pair of circuit paths connected between the alternating current wave source and the load circuit for individually passing alternate half-cycles of an alternating current wave from the alternating current wave source having a phase opposite to the first given phase, each of said circuit paths including a saturable reactor, a separate winding for each of the saturable reactors for establishing levels of magnetization within the saturable reactors in response to current flow through the control winding, a source of control signals, means for passing selected half-cycles of an alternating current wave through the control windings in response to the control signals to establish levels of magnetization within the saturable reactors so that a portion of each alternate half-cycle of the alternating current wave from the alternating current wave source is passed to the load circuit corresponding to a control signal from the control signal source, and means for selectively varying the operational level of the last-mentioned means to vary the levels of magnetization established within the saturable reactors so that the saturable reactors pass circulating currents around the load circuit during at least a portion of each half-cycle of the alternating current wave so as to enhance the speed of response of the magnetic amplifier to changes in control signals.

8. A full wave reversible phase magnetic amplifier including the combination of a transformer having a primary winding and two secondary windings, means for applying an alternating current wave to the primary winding, each of said secondary windings being center tapped, a single-ended load circuit having one end connected to the center tap of the secondary windings, two alternate circuit paths connected between each end of a first one of the secondary windings and the load circuit, each of said circuit paths including a saturable reactor load winding and a unidirectional conduction device for selectively passing alternate half-cycles of an alternating current wave appearing across the first one of the secondary windings to the load circuit, each of said saturable reactors having a control winding for establishing a desired level of magnetization within the saturable reactors in response to current flow therethrough, a source of control signals, each of said control windings being connected serially between the second one of the secondary windings and the control signal source to reset the saturable reactors to a desired level of magnetization in accordance with the control signal, and means establishing circulating currents through said saturable reactor load windings whereby a first portion of each half-cycle of the alternating current wave appearing across the first one of the secondary windings is passed to the load circuit via one of the saturable reactors to produce an output signal in the load circuit having a phase and amplitude corresponding to the control signal, and a second portion of each half-cycle of the alternating current wave appearing across the first one of the secondary windings is passed by at least two of the saturable reactor load windings bypassing the load circuit.

9. A magnetic amplifier in accordance with claim 8 in which the control signal source comprises a pair of signal input terminals, a pair of transistors, each of said transistors being connected serially with the control windings associated with two of the saturable reactors, and means for applying the signal from the control signal terminals to the transistors for biasing the transistors in a direction in which currents flow through the control windings to reset the saturable reactors.

10. A magnetic amplifier in accordance with claim 9 in which said circulating current establishing means includes means for establishing a controllable bias on the transistors to cause current to flow through the control windings at selected magnitudes which determine the duration of the output signal at the load.

11. A full wave reversible phase magnetic amplifier including the combination of a source of alternating current waves, a first circuit path connected across said alternating current source including a pair of saturable reactors, a second circuit path connected across the alternating current source including another pair of saturable reactors, a common junction point joining the first and second circuit paths between each of said pairs of saturable reactors, a plurality of control windings one of which is associated with each of the saturable reactors, and means for establishing different selectable levels of magnetization within the saturable reactors to enable a first one of the saturable reactors to pass currents to the common junction point during a first portion of each half-cycle of a wave from the alternating current source and to enable a second one of the saturable reactors to pass currents between the common junction point and the alternating current wave source during an interval succeeding the interval in which the first of the saturable reactors is enabled to pass current to the common junction point.

12. A full wave reversible phase magnetic amplifier including the combination of a source of alternating current waves, a first circuit path connected across the alternating current wave source for passing currents flowing in one direction, said first circuit path including a first pair of saturable reactors connected serially, a second circuit path connected across the alternating current wave source for passing currents in a direction opposite to the first given direction, said second circuit path including a second pair of saturable reactors connected serially, a common junction point joining the first and second circuit paths at the series connections between said first and second pairs of saturable reactors, a load circuit connected between the common junction point and the alternating current wave source, means for establishing a level of magnetization within at least one of said saturable reactors to pass currents from said alternating current wave source to said load circuit during a first portion of each half-cycle of a wave from said source, and means establishing a level of magnetization in at least one other of said saturable reactors for passing current between the common junction point and the alternating current source during a second portion of each half-cycle succeeding said first portion whereby the current is bypassed around the load circuit during said second portion of each half-cycle of said alternating current wave.

13. A full wave reversible phase magnetic amplifier including the combination of a source of alternating current waves, a first current path connected across said source for passing current in one given direction, a second current path connected across said source for passing current in a direction opposite to said first given direction, each of said circuit paths including a pair of saturable reactors connected serially, a common junction point joining said first and second circuit paths at the series connections between said pairs of saturable reactors, a load circuit connected between said common junction point and said alternating current wave source, a plurality of control windings associated with the saturable reactors, means for passing control currents to the control windings to establish a level of magnetization within at least one of the saturable reactors to cause current to be passed through at least one of the saturable reactors to the load circuit during a first portion of each half-cycle of the alternating current waves, and biasing means for varying the control currents through the control windings to establish a level of magnetization within at least one other of the saturable reactors to establish circulating currents through at least one of said circuit paths which bypass the load circuit during a second portion of each half-cycle of the alternating current waves.

14. A full wave reversible phase magnetic amplifier including the combination of a source of alternating current waves, a first circuit path connected across said alternating current wave source, said first circuit path including a pair of saturable reactors connected serially, a second circuit path connected across said source of alternating current waves, said second circuit path including a pair of saturable reactors connected serially, a common junction point connected to each of the saturable reactors of said pairs of saturable reactors, a load circuit connected between the common junction and the alternating current source, a plurality of control windings associated with the saturable reactors for establishing variable levels of magnetization therein in response to current flow therethrough, and means for passing currents through the control windings to establish predetermined levels of magnetization within the saturable reactors at which at least two of the saturable reactors are successively enabled to pass current during each half-cycle of said alternating current wave whereby current is passed to the load circuit during a portion of each half-cycle preceded by a period in which current flow is blocked by the saturable reactors and succeeded by a period in which a circulating current is established via one of the circuit paths through two of the saturable reactors bypassing the load circuit.

15. An electrical circuit for controlling the direction and magnitude of current applied to a load from an A.-C. source comprising a source of A.-C. voltage, a load, saturable core inductance means connected between the source and the load, means for controlling the magnetization level of selected ones of the saturable core inductance means to determine the point in each half-cycle of source voltage when current is passed to the load, and means for controlling the magnetization level of others of the saturable core inductance means to determine the point in each half-cycle when the flow of current to the load is terminated.

16. An electrical circuit in accordance with claim 15 wherein the saturable core inductance means comprise a saturable reactor having a core of remanently magnetic material and only two windings on said core.

17. An electrical circuit in accordance with claim 16 wherein said two windings comprise one load winding and one control winding.

18. An electrical circuit in accordance with claim 17 wherein the magnetization level controlling means comprises switching means selectively connecting the control windings with the A.-C. source for passing predetermined magnitudes of current through selected ones of the control windings.

19. An electrical circuit in accordance with claim 18 wherein the switching means comprises first and second transistors, each in series connection with the control windings of an associated pair of saturable reactors, and the level controlling means further comprises means for individually controlling the impedance of the transistors.

20. An electrical circuit in accordance with claim 19 wherein the impedance controlling means comprises means for establishing the direction of current in the load in accordance with a selected control signal.

21. An electrical circuit in accordance with claim 20, wherein the direction establishing means comprises means for producing an alternating current of reversible phase in the load in accordance with an alternating control signal and for producing a unidirectional current of reversible polarity in the load in accordance with a D.-C. control signal.

22. An electrical circuit in accordance with claim 20 wherein the direction establishing means comprises means for producing an alternating current of reversible phase in the load in accordance with a D.-C. control signal and for producing a unidirectional current of reversible polarity in the load in accordance with an alternating control signal.

References Cited in the file of this patent

UNITED STATES PATENTS

| | | |
|---|---|---|
| 2,770,770 | Lufcy | Nov. 13, 1956 |
| 2,809,241 | Weissman | Oct. 8, 1957 |
| 2,813,246 | Siskind | Nov. 12, 1957 |
| 2,871,430 | Fox et al. | Jan. 27, 1959 |

OTHER REFERENCES

Suozzi: "A Transistor-Amplifier," NAVORD Report 2891.

Pittman: "Transistor Control of Magnetic Amplifiers," Radio-Electronic Engineering, February 1954.

Naval Research Laboratory Report 4541, "Full Wave Reversible-Polarity Half-Cycle Response Magnetic Amplifiers," by C. B. House, June 20, 1955.